3,336,259
AROMATIC POLYOL CROSS-LINKED THERMOSET RESIN COMPOSITIONS
Robert L. Zimmerman and Willard E. Alexander, Midland, Mich., assignors to The Dow Chemical Company, Midland, Mich., a corporation of Delaware
No Drawing. Filed Feb. 5, 1964, Ser. No. 342,789
8 Claims. (Cl. 260—47)

This invention relates to thermoset resin compositions comprising a homogeneous copolymer of a monovinylidene aromatic compound and an $\alpha,\beta$-unsaturated cyclic anhydride and an aromatic hydroxyl containing curing agent.

The invention further relates to heat-converted protective and decorative coatings, laminates and moldings of the thermosetting compositions for machines, household appliances, automotive equipment, tools, metal panels and the like and to articles coated with a cured coating of the thermoset resin compositions.

Vinylidene aromatic compounds which are suitable include, for example, styrene, vinyltoluene, t-butyl styrene, ar-mono- or di-chlorostyrene, $\alpha$-methylstyrene, vinylxylene and the like.

$\alpha,\beta$-Unsaturated dicarboxylic anhydrides which are suitable include, for example, maleic anhydride, chloromaleic anhydride, dichloromaleic anhydride, citraconic anhydride, itaconic anhydride, phenyl maleic anhydride and aconitic anhydride.

The copolymer employed in this invention advantageously contains from 5 to 40 mole percent, preferably 5 to 15 mole percent, of the cyclic anhydride and correspondingly from 95 to 60 or 95 to 85 mole percent of the monovinylidene aromatic monomer. The invention includes partially esterfied copolymers which can be esterified up to about 80 percent, wherein 200 percent denotes complete esterification with a monoalcohol.

Polymers having a solution viscosity of no more than 10 cps. (10 percent in methyl ethyl ketone) at 25° C. are advantageously employed. The preferred polymers have a viscosity of 0.5 to 1.7 cps. Most advantageously the polymers are of homogeneous composition, that is, the cyclic anhydride content of at least 90 weight percent of the polymer is within a 5 weight percent range, most desirably within a 2 weight percent range as determined by fractional precipitation analysis.

The polyol is advantageously an aromatic compound with two or more hydroxyl groups, at least one of which is nonphenolic and in which the ratio of aliphatic to aromatic carbons is not greater than 3:2. Representative polyols are p-xylylene glycol, dihydroxymethyl diphenyl oxide, dimethylol phenol, alkylene oxide adducts of polyphenols such as Bisphenol A and hydroquinone, polyacid/polyol polyesters with terminal OH groups, and the like. Optionally, aliphatic polyols and other reactive ingredients such as organic monoalcohols, amines, mercaptans, and acids may be coreacted in the thermosetting formulations, as well as other thermosetting ingredients such as formaldehyde resins.

The compositions of this invention containing the aromatic polyols have improved heat distortion and exhibit better heat resistance with respect to similar compositions cured with aliphatic polyols. The aromatic polyols also have improved compatibility with the base copolymers both in solution and in the dried state. The improved compatibility results in better strength in products such as preimpregnated paper.

The composition of this invention advantageously comprises from 3 to 50 weight percent of the polyol, preferably from 5 to 25 weight percent. For best results the ratio of hydroxyl to anhydride should fall within the range of 0.3 to 1.5

The combination of a low molecular weight copolymer and a relatively large amount of the polyol additive provide impregnating solutions of high solids. Solutions of 50 percent solids or greater have practical working viscosities.

The mixture of resinous copolymer and curing agent can be in solution in an organic solvent, or, for high anhydride polymers, can be dissolved in an aqueous base. The mixture can also be dry, as cast from a solution or a fine dry blend of the ingredients. The product mixture is reactive and may cure at ambient temperature, although it is preferably heated at 300–400° F. for a time sufficient to cause reaction, typically 5 to 60 minutes. The cured product is a cross-linked, largely insoluble or intractable resin that is hard and heat resistant. For greatest utility, the compositions are employed with fibrous or powdered fillers such as glass fibers, asbestos, paper, cotton, silica, carbon black, sisal, wood flour, metal powders and the like.

The invention is further illustrated by the following example.

*Example 1*

A styrene copolymer of 1.28 cps. viscosity containing 10.25 weight percent maleic anhydride prepared by the method of Ser. No. 33,376, filed June 2, 1960, was mixed with a series of aromatic polyols on a two-roll mill at 160–180° C. (The polyol was added in a ratio of 1.5 hydroxyl groups per anhydride group.) The resulting partially cured mixture was ground, then compression molded for ½ hour at 350° F. into an ⅛″ thick chip. Heat distortion temperatures of the chips were measured on a modified Vicat apparatus similar to that described in ASTM designation D–1525–58T. Extent of crosslinking was determined as that portion of the cured chip which was insoluble in methyl ethyl ketone. Approximately one gram of the sample was weighed and soaked for 48 hours at room temperature in methyl ethyl ketone (MEK), after which the undissolved portion was collected, dried, and weighed. The results are given in the following table.

TABLE I

| Curing Agent | OH Eq. Wt. | Curing Agent, Weight Percent | Heat Distortion (Vicat), ° C. | Percent Insoluble in MEK |
|---|---|---|---|---|
| 2,6-dimethylol-4-methyl phenol | 83 | 7.98 | 114.9 | 80.7 |
| p-Xylylene glycol | 69 | 9.78 | 95.4 | 99.3 |
| Ethylene oxide adduct of Bisphenol A | 158 | 19.9 | 86.1 | 84.2 |
| Oxy-bis-benzyl alcohol-p,p' | 125 | 16.4 | 106.8 | 98.6 |
| Di(ethylene glycol)tetrabromophthalate | 285 | 30.9 | 90.4 | 67.7 |
| Di(diethanolamine) phthalate | 78 | 10.9 | 119.2 | 95.0 |
| Propylene oxide adduct of Bisphenol A | 172 | 21.2 | 72.4 | 45.3 |
| Di(hydroxymethyl) diphenyl oxide [1] | 126 | 16.4 | 76.6 | 96.7 |

[1] Prepared by hydrolysis of chloromethylated diphenyl oxide mixed isomers.

*Example 2*

Samples for Table II were prepared by mixing the indicated amount of aromatic curing agent in 50 percent acetone (to provide 1.5 hydroxyl groups per anhydride group), to a solution containing 50 weight percent of a 1.28 centipoise styrene/10.25 percent maleic anhydride copolymer in acetone. The compatibility of this solution was noted, and a portion of the solution was allowed to evaporate to dryness and the compatibility in the absence of acetone noted. Another portion was used to impregnate a 10 mill cotton linter paper to about 60 percent solids. The unimpregnated paper had a tensile strength of 1980 p.s.i. Tensile strengths of the dried impregnated paper are shown. Another portion of said solution was catalyzed with 0.5 percent DMP-30 [tri(dimethylaminomethyl)-phenol] based on resin solids and heated to 400° F. in an open dish for one hour, during which time the acetone volatilized and the sample cured. The MEK insoluble portion was measured as in Example 1.

of the solvent and unpolymerized monomers to recover the resin the half ester partially reverted to maleic anhydride. The resins were analyzed by titration of hydrolyzed and anhydrous samples to determine the relative proportions of half ester and anhydride.

TABLE II

| Curing Agent | Curing Agent, Weight Percent | Compatibility of 50% Resin/Curing Agent in Acetone | Uncured Dry Resin Curing Agent | | (0.5% DMP-30) percent MEK Insol. from Open Dish Test, 400° F./1 hr. |
|---|---|---|---|---|---|
| | | | Appearance | Paper Pre-Preg. Tensile, p.s.i. | |
| Propylene oxide adduct of Bisphenol A | 21.2 | Compatible | Compatible | 3,145 | 81.8 |
| Di(hydroxylmethyl) diphenyl oxide | 16.4 | do | do | 3,694 | 91.2 |

*Example 3*

Styrene/maleic anhydride copolymer, 10 g., and Dow Resin 565 [propylene oxide adduct of Bisphenol A (OH equiv. weight 172)] were dissolved in 20 g. MEK. A catalyst, Arquad 12–50 (dodecyl trimethyl ammonium chloride 50 percent in isopropyl alcohol), was added volumetrically and a portion of the solution cast in an aluminum moisture dish. After drying overnight the cast sample was baked at 160° C. for one hour and examined. (See Table III.) Clarity, cure as measured by insolubility in MEK, and hardness were good in all cases.

TABLE III

| S/MA Resin | | | Wt. Curing Agent, Gms. | Percent Curing Agent | Arquad 12-50, cc. |
|---|---|---|---|---|---|
| Wt. Percent MA | Mole, Percent | Visc., cps. | | | |
| 5.83 | 6.2 | 7.5 | 0.956 | 8.7 | 0.07 |
| 8.26 | 8.7 | 6.9 | 1.355 | 12.0 | 0.08 |
| 14.8 | 15.6 | 4.7 | 2.43 | 19.5 | 0.08 |
| 19.9 | 20.9 | 4.2 | 3.26 | 24.6 | 0.09 |
| 27.0 | 28.2 | 4.4 | 4.43 | 30.7 | 0.10 |
| 32.4 | 33.7 | 3.4 | 5.3 | 34.7 | 0.10 |

*Example 4*

The procedure of Example 3 was followed using 10 g. samples of partial esters of styrene/maleic anhydride. These resins were prepared by the continuous polymerization method of Ser. No. 33,376, filed June 2, 1960, using a monomeric feed consisting of styrene, isooctyl acid maleate and methyl ethyl ketone. Upon devolatilization The cured samples were clear, hard and essentially insoluble in MEK.

TABLE IV

| Mole, percent IOAM | Mole, percent MA | Mole, percent S | Esterification | Visc., cps. | Wt. Curing Agent, Gms. | Percent Curing Agent | Arquad 12–50 cc. |
|---|---|---|---|---|---|---|---|
| 3.53 | 6.1 | 90.4 | 58 | 4.2 | 1.425 | 12.5 | 0.08 |
| 6.75 | 11.2 | 82.1 | 58 | 2.8 | 2.60 | 20.7 | 0.08 |
| 7.05 | 1.94 | 91 | 46 | 2.7 | 3.69 | 27.0 | 0.09 |

*Example 5*

The fiberglass laminates shown in Table V were made by stacking 12 plies of impregnated style 181 glass cloth having a Volan A finish and curing in a compression press for ½ hour at 350° F. and 360 p.s.i. pressure. The impregnating solutions contained 40 percent by weight of resin solids in acetone, the resin solids consisting of a 1.42 centipoise styrene/10.25 percent maleic anhydride copolymer admixed with the curing agent (calculated to provide 1.5 hydroxyl groups per anhydride group). As catalyst, 0.5 weight percent of DMP-30 [tri(dimethylaminomethyl)phenol] was added immediately before impregnation. The cloth was coated with this resin solution then air-dried for about 24 hours to remove the acetone. The dried preimpregnated cloth contained about 45 percent resin.

The polyester curing agents shown in the table were made as follows: (1) EGA—tetrabromophthalic anhydride was prepared by reacting 3 gm. moles of tetrabromophthalic anhydride with 6 gm. moles of ethylene glycol (plus 20 percent excess) in the presence of 100 gms. xylene, at reflux until an acid number of 39.0 mg KOH per gram resin had been obtained. PAGL—No. 5 and No. 6 were prepared by reacting phthalic anhydride (1 mole), glycerine (1 mole), and lauric acid (0.4 mole) in the presence of refluxing xylene until the acid number was 30.9 for No. 5 and 17.7 mg. KOH per gram resin for No. 6.

TABLE V.—PROPERTIES OF POLYOL CURED THERMOSETTING LAMINATE

| Laminate No. | Curing Agent | OH Equiv. Wt. | Wt. percent of Curing Agent | Laminate Thickness (inches) | Wt. Gain 2 Hr. H₂O Boil | Tensile Str. Modulus × 10⁻⁶, p.s.i. 75° F. |
|---|---|---|---|---|---|---|
| 1 | Dihydroxy methyl DPO | 126 | 16.46 | 0.137 | 0.14 | 55,000/2.24 |
| 2 | Oxy-bis-benzyl alcohol | 125 | 16.42 | 0.139 | 0.181 | 56,000/2.06 |
| 3 | EGA tetrabromophthalic Anh. | 285 | 30.96 | 0.099 | 1.68 | 35,000/3.24 |
| 4 | PAGL, No. 5 | 412 | 46.10 | 0.093 | 2.61 | 34,000/3.07 |
| 5 | PAGL, No. 6 | 455 | 41.78 | 0.094 | 3.73 | 32,000/2.80 |

We claim:

1. Composition comprising a copolymer of a monovinylidene aromatic compound of the benzene series and an α,β-unsaturated cyclic anhydride, and an aromatic polyol curing agent containing two or more hydroxyl groups, at least one of which is nonphenolic and in which the ratio of aliphatic to aromatic carbons is not greater than 3:2.

2. Composition of claim 1 wherein the copolymer contains from 5 to 40 mole percent of the cyclic anhydride.

3. Composition of claim 1 wherein the copolymer contains from 5 to 15 mole percent of the cyclic anhydride.

4. Composition of claim 1 wherein the polyol comprises from 3 to 50 weight percent of the total mixture.

5. Composition of claim 1 wherein the aromatic compound is styrene.

6. Composition of claim 1 wherein the cyclic anhydride is maleic anhydride.

7. Composition of claim 1 wherein the polyol is a member of the group consisting of 2,6-dimethylol-4-methyl phenol, oxy-bis-p,p'-benzyl alcohol and di(diethanolamine)phthalate.

8. Composition of claim 1 wherein the ratio of hydroxyl to anhydride is from 0.3 to 1.5.

References Cited

UNITED STATES PATENTS 2,912,413  11/1959  Baer _____ 260—75

OTHER REFERENCES

Widdop, H.: Laminates, in Modern Plastics Encyclopedia Issue, September 1963, 554–560.

WILLIAM H. SHORT, *Primary Examiner.*

M. GOLDSTEIN, *Assistant Examiner.*